(12) United States Patent
Vengroff et al.

(10) Patent No.: US 10,827,315 B2
(45) Date of Patent: Nov. 3, 2020

(54) FACILITATING USER INTERACTIONS BASED ON PROXIMITY

(71) Applicant: GROUPON, INC., Chicago, IL (US)

(72) Inventors: Darren E. Vengroff, Seattle, WA (US); Jeffrey Alan Holden, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/257,122

(22) Filed: Jan. 25, 2019

(65) Prior Publication Data

US 2019/0297467 A1    Sep. 26, 2019

Related U.S. Application Data

(63) Continuation of application No. 15/439,985, filed on Feb. 23, 2017, now Pat. No. 10,219,119, which is a continuation of application No. 13/363,239, filed on Jan. 31, 2012, now Pat. No. 9,614,921, which is a continuation of application No. 12/950,709, filed on Nov. 19, 2010, now Pat. No. 8,150,439, which is a continuation of application No. 11/697,617, filed on Apr. 6, 2007, now Pat. No. 7,840,224.

(Continued)

(51) Int. Cl.
| | |
|---|---|
| *H04W 4/08* | (2009.01) |
| *H04L 29/08* | (2006.01) |
| *H04W 8/18* | (2009.01) |
| *H04W 4/029* | (2018.01) |

(52) U.S. Cl.
CPC ............. *H04W 4/08* (2013.01); *H04L 67/18* (2013.01); *H04L 67/24* (2013.01); *H04L 67/306* (2013.01); *H04W 4/029* (2018.02); *H04W 8/186* (2013.01)

(58) Field of Classification Search
CPC ...................................................... H04W 4/08
See application file for complete search history.

(56) References Cited

U.S. PATENT DOCUMENTS 6,553,236 B1 *  4/2003  Dunko ................... H04L 63/08
                                                    455/456.1
6,975,873 B1 * 12/2005  Banks ................... H04W 64/00
                                                    455/456.1

(Continued)

OTHER PUBLICATIONS

U.S. Application filed Sep. 14, 2012; In re: Vengroff et al., entitled "Proximity-Based User Interaction", U.S. Appl. No. 13/620,511.

(Continued)

*Primary Examiner* — Ankur Jain
(74) *Attorney, Agent, or Firm* — Alston & Bird LLP

(57) ABSTRACT

Techniques are described for providing location-based information and functionality to people and computing devices in various ways. In at least some situations, the techniques include enabling multiple people in a common geographic area to interact in various ways, such as via devices capable of communications (e.g., cellular telephones, computing devices with wired and/or wireless communications capabilities, etc.). In addition, the techniques include enabling the creation and maintenance of location-based virtual groups of users (also referred to as "clouds"), such as for users of mobile and/or fixed-location devices. Such clouds may enable various types of interactions between group members, and may be temporary and/or mobile.

21 Claims, 10 Drawing Sheets

Related U.S. Application Data

(60) Provisional application No. 60/790,276, filed on Apr. 7, 2006.

(56) References Cited

U.S. PATENT DOCUMENTS

| | | | | |
|---|---|---|---|---|
| 7,120,455 | B1* | 10/2006 | Chen | H04L 51/04 |
| | | | | 455/466 |
| 7,209,755 | B2* | 4/2007 | Gorday | H04W 4/029 |
| | | | | 455/456.1 |
| 7,239,871 | B2* | 7/2007 | Shamp | G06Q 30/0207 |
| | | | | 370/328 |
| 7,359,724 | B2 | 4/2008 | Torvinen | |
| 7,447,508 | B1* | 11/2008 | Tendler | H04M 3/493 |
| | | | | 455/456.2 |
| 7,457,634 | B2* | 11/2008 | Morinaga | G06Q 20/208 |
| | | | | 398/91 |
| 7,840,224 | B2* | 11/2010 | Vengroff | H04W 4/029 |
| | | | | 455/456.1 |
| 8,150,439 | B2 | 4/2012 | Vengroff et al. | |
| 8,509,401 | B2* | 8/2013 | Yoshimachi | H04L 12/189 |
| | | | | 379/90.01 |
| 8,554,875 | B1* | 10/2013 | Alfaro | G06Q 50/01 |
| | | | | 709/218 |
| 8,605,094 | B1* | 12/2013 | Alfaro | G06T 11/60 |
| | | | | 345/440 |
| 8,654,683 | B2* | 2/2014 | Lu | H04W 84/02 |
| | | | | 370/259 |
| 8,693,689 | B2* | 4/2014 | Belenkiy | H04L 9/0872 |
| | | | | 380/270 |
| 8,993,689 | B1* | 3/2015 | Harvey | C08G 18/00 |
| | | | | 525/452 |
| 9,100,454 | B2* | 8/2015 | Holden | H04W 4/08 |
| 9,264,874 | B2* | 2/2016 | Fraccaroli | H04W 4/21 |
| 9,380,120 | B2 | 6/2016 | Holden et al. | |
| 9,459,035 | B2* | 10/2016 | Buchstab | F25C 5/046 |
| 10,142,784 | B2 | 11/2018 | Holden et al. | |
| 2002/0019829 | A1* | 2/2002 | Shapiro | H04L 29/06 |
| 2002/0098849 | A1* | 7/2002 | Bloebaum | G01S 5/0072 |
| | | | | 455/456.3 |
| 2002/0111173 | A1* | 8/2002 | Hendrey | H04W 76/40 |
| | | | | 455/456.3 |
| 2002/0164995 | A1* | 11/2002 | Brown | G01S 5/02 |
| | | | | 455/456.1 |
| 2002/0183072 | A1* | 12/2002 | Steinbach | G06F 16/9537 |
| | | | | 455/456.1 |
| 2003/0003933 | A1* | 1/2003 | Deshpande | H04L 29/06 |
| | | | | 455/510 |
| 2003/0020623 | A1* | 1/2003 | Cao | G01C 21/20 |
| | | | | 340/686.6 |
| 2003/0083046 | A1* | 5/2003 | Mathis | H04L 12/1818 |
| | | | | 455/412.1 |
| 2003/0096621 | A1* | 5/2003 | Jana | G08G 1/0104 |
| | | | | 455/456.1 |
| 2003/0096628 | A1* | 5/2003 | Bar-On | H04W 4/029 |
| | | | | 455/518 |
| 2003/0100326 | A1* | 5/2003 | Grube | H04W 84/08 |
| | | | | 455/515 |
| 2003/0186716 | A1* | 10/2003 | Dorenbosch | H04W 72/005 |
| | | | | 455/519 |
| 2004/0111184 | A1* | 6/2004 | Chiappetta | G05D 1/0225 |
| | | | | 700/245 |
| 2005/0113123 | A1* | 5/2005 | Torvinen | H04W 4/021 |
| | | | | 455/519 |
| 2005/0149443 | A1* | 7/2005 | Torvinen | A63F 13/12 |
| | | | | 705/51 |
| 2005/0210104 | A1* | 9/2005 | Torvinen | G06Q 10/10 |
| | | | | 709/205 |
| 2005/0221812 | A9* | 10/2005 | Gailey | G06Q 10/06 |
| | | | | 455/422.1 |
| 2005/0233776 | A1* | 10/2005 | Allen | H04W 84/08 |
| | | | | 455/567 |
| 2005/0239405 | A1 | 10/2005 | Myyry et al. | |
| 2007/0133435 | A1* | 6/2007 | Eneroth | H04M 3/566 |
| | | | | 370/260 |
| 2012/0329483 | A1 | 12/2012 | Vengroff et al. | |
| 2014/0328190 | A1* | 11/2014 | Lord | H04W 24/08 |
| | | | | 370/252 |
| 2017/0134339 | A1* | 5/2017 | Bortnikov | H04L 61/2007 |

OTHER PUBLICATIONS

T-Mobile, "Unlimited Cell Phone Calls to Your Five Favorite People—my Faves From T-Mobile," accessed May 31, 2007, from http://www.mvfaves.com/what-is-myfaves.html, 1 page.

MySpace.com, "Take the MySpace Tour," accessed May 31, 2007, from http://collect.myspace.com/misc/tour 1.html, 6 pages.

MySpace.com, "About Us," accessed May 31, 2007, from http://www.myspace.com/Modules/Common/Pages/AboutUs.aspx, 1 page.

Mullaney, T., "Online Shopping: Bargaining Power," Dec. 13, 1999, Businessweek Online, accessed May 31, 2007, from http://businessweek.com/1999/99 50/b3659033.htm?scriptFramed, 3 pages.

Kim, R., "Find Friends by Cell Phone: Loopt application's GPS program can beam map location," Nov. 14, 2006, SFGate.com, accessed May 31, 2007, from http://www.sfgate.com/cgi-bin/article.cgi?file=/c/a/2006/11/14/BUGMMMCIKEI.DTL&type=pr . . . , 2 pages.

International Search Report and Written Opinion from Corresponding International Patent Application No. PCT/US07/08590, dated Sep. 26, 2008.

Hafner, K., "Navigating the Amazon Circle," May 21, 2000, The New York Times, accessed May 31, 2007, from http://www.marcusbukingham.com/press/newPress/articles/NewYorkTimes/navAmazon.php?me . . . , 3 pages.

Facebook.com, "About Facebook," accessed May 31, 2007, from http://www.facebook.com/about.php, 1 page.

Classmates.com, "Welcome to Help Center," accessed May 31, 2007, from http://www.classmates.com/cmo/help/index.jsp, 1 page.

Classmates.com, "About Classmates Online, Inc.," accessed May 31, 2007, from http://www.classmates.com/cmo/about/index.jsp, 1 page.

Buzz Networker.com, "Facebook Feature: Sponsored Groups," accessed May 31, 2007, from http://www.buzznetworker.com/facebook-feature-sponsored-groups/, 2 pages.

\* cited by examiner

View All Participants

Cloud participants 1-10 of 45:

1. Mike Jones (You)
2. John Michaels
3. Fred Freeland
4. Joe Adams
5. Christy Brooks
6. Sarah Brown
7. Derek Ferguson
8. Jeff Jacobson
9. Anne Gables
10. Jennifer Stevens Page [1] [2] [3] [4] [5]

*FIG. 1E*

You have successfully joined "John's Party."

44 other people are currently in this cloud.

View all participants (45)
View Favorite People (0)
Send a message to the cloud (45)

*FIG. 1D*

Jennifer Stevens

Female
Height: 5'6"
Age: 24
I'm here to meet new people, so stop by and say hi!

1 Send Message to Jennifer
2 Add Jennifer to Favorite People
3 Invite Jennifer to be a friend
4 Reveal location to Jennifer

FACILITATING USER INTERACTIONS BASED ON PROXIMITY

CROSS REFERENCE TO RELATED APPLICATIONS

This application is a continuation of U.S. application Ser. No. 15/439,985 filed on Feb. 23, 2017, which is a continuation of U.S. application Ser. No. 13/363,239, filed on Jan. 31, 2012, now U.S. Pat. No. 9,614,921, which is a continuation of U.S. application Ser. No. 12/950,709, filed on Nov. 19, 2010, now U.S. Pat. No. 8,150,439, which is a continuation of U.S. application Ser. No. 11/697,617, filed on Apr. 6, 2007, now U.S. Pat. No. 7,840,224, which claims the benefit of provisional U.S. Patent Application No. 60/790,276, filed Apr. 7, 2006 which are hereby incorporated by reference in its entirety.

TECHNICAL FIELD

The following disclosure relates generally to techniques for facilitating user interactions based on proximity, such as to provide functionality to location-based virtual groups of users.

BACKGROUND

There are many situations in which people would benefit from receiving information based on their geographic location, such as to obtain information about businesses near the geographic location and/or to interact with other people near the geographic location. This is particularly true when people are mobile, such as traveling or otherwise changing their current geographic location. Unfortunately, existing techniques for providing location-based information and functionality to people suffer from numerous problems.

Thus, it would be beneficial to provide improved techniques for providing location-based information and functionality to people and computing devices, as well as to provide various additional related capabilities and benefits.

BRIEF DESCRIPTION OF THE DRAWINGS

FIGS. 1B-1F illustrate examples of providing location-based information and functionality to a user via an example graphical user interface displayed on a mobile device of the user.

DETAILED DESCRIPTION

Figure 1A:
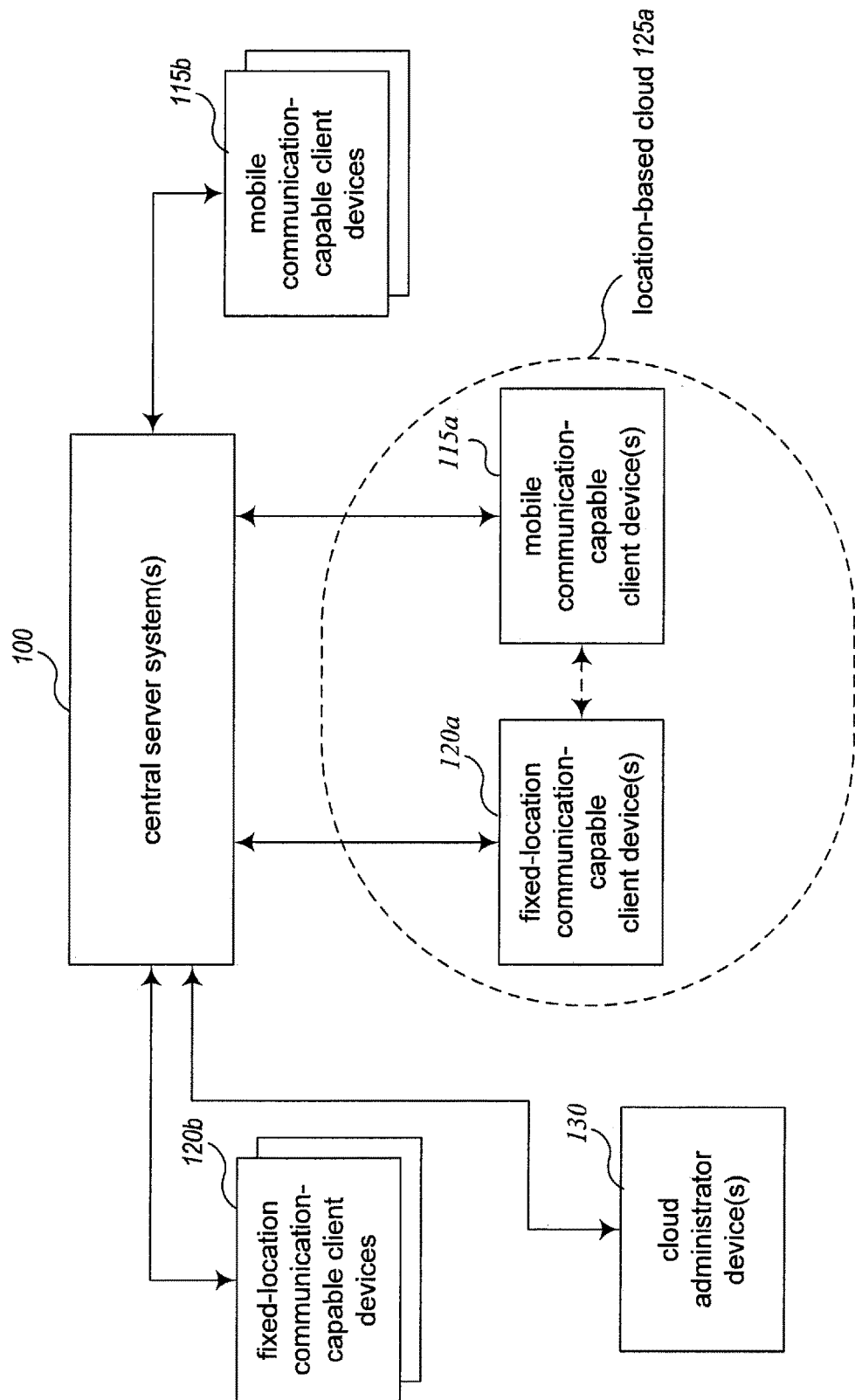
FIG. 1A is a network diagram illustrating interactions between various devices and systems located in various geographic locations.

Techniques are described for providing location-based information and functionality to people and computing devices in various ways. In at least some embodiments, the techniques include enabling multiple people in a common geographic area to interact in various ways. For example, if each of the people is a user of one or more devices capable of communications (e.g., cellular telephones, computing devices with wired and/or wireless communications capabilities, etc.), the users may be allowed to inter-communicate via their communication-capable devices in various ways. Furthermore, in at least some embodiments, some or all such users in a particular geographic area may further be allowed to inter-communicate with one or more entities in or related to the geographic area, such as one or more businesses.

In at least some embodiments, the techniques for providing location-based information and functionality to people and computing devices include enabling the creation and maintenance of location-based virtual groups of users, such as for users of mobile and/or fixed-location devices. The location-based virtual groups, also referred to as "clouds," may enable various types of interactions between group members in various embodiments, as described in greater detail below. In some embodiments, the clouds may be temporary, such as to exist for only days, hours, or minutes. Furthermore, in at least some embodiments, clouds may be mobile, such as to move with one or more people, objects, or other entities. Additional details related to clouds are included below. In addition, in at least some embodiments, the described techniques are automatically performed by an embodiment of a Cloud Management system, as described in greater detail below.

In at least some embodiments, the communication-capable devices of the users include networked devices capable of communicating with other networked devices, whether via wireless or wired protocols. Furthermore, an arbitrary set of networked device users is enabled to join a cloud in which they may interact in a specified fashion, such as based on software executing on the networked devices or hardware embedded in the networked devices, and/or via one or more central server computing systems that interact with the networked devices. In various embodiments, the networked devices communicate their locations, user-entered pass codes and other information to a central server, and the central server uses this transmitted information as well as other information (e.g., personal profile information about the device users, current time, cloud configuration, etc.) to determine whether a user is admitted to any of the various clouds it manages. Furthermore, in at least some embodiments, a cloud is "anchored" to a specific point (e.g., a latitude, longitude, altitude coordinate) or entity (a person, building, vehicle, etc.), referred to as the cloud's anchor. A user may participate in any number of clouds simultaneously in at least some embodiments.

FIG. 1A is a network diagram illustrating example interactions between various devices and systems located in various geographic locations. The illustrated example includes one or more central server systems 100 operated by an entity (not shown) to provide cloud management functionality (e.g., as a business, such as for profit). In this example, various mobile communication capable client devices 115 and fixed-location communication-capable client devices 120 are able to communicate with the central server(s), as are one or more devices 130 used by cloud administrator users who may configure and manipulate clouds. In this example, two or more communication-capable devices are co-located in a common geographic area, and are participating in a location-based cloud 125a on behalf of their users (not shown). The devices in the cloud may include one or more mobile communication capable client devices 115a and/or one or more fixed-location communication-capable client devices 120a. The devices of the cloud and their users may interact in various ways, including by sending communications to each other via the central server system(s) and/or directly between each other.

For illustrative purposes, some embodiments are described below in which specific types of users and devices interact in specific manners as part of specific types of clouds, such as to obtain specific types of functionality coordinated by one or more cloud management systems provided by one or more central servers. These examples are provided for illustrative purposes and are simplified for the sake of brevity, and the inventive techniques can be used in a wide variety of other situations, some of which are discussed below.

In various embodiments, one person will act as a cloud administrator for a cloud. This person may, for example, establish a geographical boundary for the cloud such that a user physically present within the geographical boundary may be allowed to join the cloud, and may further define various configuration information for the cloud (e.g., by establishing a pass code that users will specify to join the cloud; by establishing termination criteria to determine when a temporary cloud will end, such as a specific start and end date/time for the cloud; etc.). A cloud administrator may further specify one or more other admission criteria regarding which users are allowed to join a cloud, as discussed in greater detail below. In addition, the administrator may also establish rules of interaction among users who are members of a cloud, and can dissolve the cloud manually if desired (e.g., if there is no end date/time set for the cloud or the administrator wishes to terminate the cloud before the established end date/time). An administrator can also decide to transfer administrator status to or share administrator status with another user or users in the cloud or a designated agent who is not in the cloud. In the case of shared administrator status, all users designated as administrators generally have full administrative control over the cloud, except that there may be some limitations on administrator privileges for administrators other than the original administrator, e.g., a secondary administrator may not be able to disable the administrative privileges of the original administrator.

A cloud administrator may choose to participate in the cloud or not participate, i.e., he could define the cloud but never actually join it himself. The administrator can specify a fee that each user must pay in order to join the cloud. The fee may vary among users, depending on, for example, a user's status or location, e.g., users who are already inside a venue or the first N users to join the cloud may not have to pay to join an associated cloud; alternatively, the administrator may choose to manually apply various fee levels to specific users or groups of users. In various embodiments, the administrator(s) can monitor or otherwise view information about cloud activity, e.g., the number of users who have joined and/or exited, the number of conversations in progress, etc. both during the cloud's existence and after its termination. A record or log of all or some cloud activities (e.g., user actions) could be provided (either while the cloud is in progress or afterward or both) to some or all users who participated in a cloud.

A non-exclusive list of example forms of user interaction rules inside a cloud is as follows: (a) a user may reveal personal details to al or a subset of the other users participating in the cloud, e.g., at a professional conference, a user participating in a cloud associated with the conference may choose to reveal his professional history, his current company and position and a set of positions he is hiring for; (b) a user may only be able to view others' personal details if he reveals his own details; (c) a user may send or broadcast messages or other content consisting of text, video, images or any other content transmittable over an electronic network, to other individual users or to groups of users; (d) a user may block messages from any user or all users; (e) at some administrator-specified maximum frequency, users may post messages to all users in the cloud; (f) users may request that another user agree to link as a "friend," which is a bidirectional trust relationship that transcends the duration of the cloud and may provide access to information and capabilities that are not granted to other members of the cloud; (g) users may "bookmark" other users, which creates a unidirectional relationship from the first (bookmarking) user to the second (bookmarked) user; (g) users may reveal their physical locations to either individuals or to all users in the cloud; the ability to see the physical location of other users may or may not require that a user reciprocally reveal his physical location; (i) users who have been invited to join a cloud but who have not yet joined may be able to communicate with participants within the cloud and/or see activity information associated with a cloud during and after the cloud's lifetime; and (j) a user may or may not be enabled to invite other users to join the cloud.

As an example of case (i), if a cloud were initiated for a party at John's home, Frank (a user who was invited to the party and given the pass code to join the cloud but who has not yet left home to go to the party) can see who is already at the party, as well as potentially other activity information (e.g., communications to some or all users in the cloud).

In various embodiments, a cloud itself is mobile. If the cloud's anchor (described earlier) moves, the cloud also moves. The cloud's anchor point/entity, shape and size can be specified by the cloud administrator, and may be altered by the administrator at any time. For example, a teacher plans to take 27 children on a walking field trip. He equips each child with a school-provided inexpensive wireless networked device (with the appropriate software or hardware) before departure. The teacher establishes a circular cloud, anchored on him, and specifies a cloud radius large enough that the children should not be more than that distance away throughout the field trip. Before departing, the teacher asks all the children to gather within the perimeter and admits them all to the cloud. As the field trip progresses, if any child leaves the boundary of the cloud, the teacher is alerted.

In order to prevent frequent unnecessary alerts, various techniques may be employed to reduce "noise" at the boundary of the cloud due to users drifting in and out of the cloud, such as inadvertently (either because they are legitimately briefly exiting and re-entering the cloud or because of occasional errors in location determination on a user's device). One simple example technique to address this issue is to apply spatial and/or temporal hysteresis to the locations of some or all cloud participants with respect to the cloud boundary. In the case of temporal hysteresis, the user would need to be outside the cloud boundary for some minimum amount of time before he was identified as having exited the cloud. In the case of spatial hysteresis, the cloud participant would need to be beyond the boundary of the cloud (computed as shortest distance to the boundary) by at least a minimum distance before he would be identified as having exited the cloud.

In various embodiments, a cloud may be used for commercial purposes, in which case the administrator may pay a fee (which may be a fixed amount, a share of revenue based on activities that occur within the cloud, a function of the number of users who are targeted to join the cloud and/or who actually join the cloud, or some other function) or provide some other consideration in order to use the cloud mechanism for commercial purposes. For example, a company like ESPN may wish to create a cloud at a specific sporting event, e.g., a Seattle Seahawks game, in order to offer a real-time sports information service to users attending the game. In some commercial-use embodiments, the administrator will have the option of being the only user enabled to post messages to all users or to any subset of the users in the cloud. As another example, a museum could establish a cloud around the entire space of the facility and thus allow anyone who entered the facility to join the cloud. Participants in the cloud would then receive location-sensitive guidance and information about works of art, e.g., when a user is standing in front of a specific painting, his networked device would receive information about that painting.

In yet another example, a restaurant, bar or similar establishment could establish a cloud within the physical boundaries of a store and allow all customers who join the cloud to place orders for food, drinks, etc. or make other requests of the establishment's staff. The ordering customer's message and his location are transmitted from the mobile device to a server and then to a client device (either another mobile device, a PC or other networked device) managed by the establishment. The human server then responds to the request (which could include sending messages to the user's mobile device) and uses the location information accompanying the request message to determine the appropriate customer to service. Similarly, certain establishments, e.g., coffee shops, could allow customers to pre-specify their order such that when the customer arrives within the cloud boundary, the order is placed and the food/drink/etc. preparation process can begin while the customer is in line. This provides for a form of pre-ordering that (a) is extremely likely to be consummated with payment by the customer (since he must arrive on site before the order is placed), and (b) allows for appropriate preparation timing (e.g., for a hot drink). As another example, a pizza delivery establishment with multiple delivery outlets could create a cloud encompassing their delivery area. Users within the delivery area could order pizza from a mobile device and the pizza delivery company would route the order to the nearest delivery outlet for processing. (Orders from outside the delivery area would not be allowed.)

In various embodiments, there will be no cloud administrator. In this case, a set of default rules, specified by a central server or the device user or a combination of the two, will apply to the user interactions in the cloud. This type of cloud is known as an "ad hoc cloud" and is established when two or more networked location-aware devices come within a pre-defined range (specified by the device users or centrally) of each other and are configured to participate in ad hoc clouds. The configuration can be controlled by the device user such that (a) he can specify whether he must approve the joining of an ad hoc cloud; (b) only ad hoc clouds meeting certain criteria are surfaced to the user, e.g., based on the personal characteristics of the second device owner (e.g., gender, single/married, is the other person already linked as a friend, physical characteristics such as age, height, weight, etc., general location of residence, job type, religious beliefs, etc.); (c) he can specify the maximum number of people allowed in an ad hoc cloud in which he is participating (which will both stop others from joining a cloud for which he is already a member and the maximum number of participants has been reached, and stop him from joining another cloud if that cloud already has greater than or equal to the maximum number of cloud users he has specified). All such configuration information is sent from the client device to a central server. In various embodiments, the central server detects when users are in appropriate proximity (based on configuration) to join an ad hoc cloud and determines whether the criteria established by the potential cloud co-participants match the profile information of the other user(s). In the case of a cloud between exactly two people, both users' profiles must match the other user's criteria for either user to be presented an opportunity to join the cloud. In the case of an ad hoc cloud among more than two users, a variety of techniques may be employed to determine whether a user is presented with an opportunity to join the cloud. One such algorithm is that each user's profile must match at least N other user's criteria in order to be presented the opportunity to join the cloud, where N is greater than or equal to 1. Another example is to allow current cloud participants to vote, and only if a sufficient number (which could be a majority, two-thirds or some other fraction of votes) acquiesce (e.g., vote "yes") is the new user presented with the opportunity to join the cloud. Such voting by cloud members (also referred to as "participants") may also be used in at least some embodiments with clouds configured by one or more administrators and/or for purposes other than admitting new users to the cloud, such as if allowed by the administrator and/or in some situations to take certain types of actions without explicit administrator approval.

In various embodiments, a cloud will create a residual permission group that survives the cloud's termination. Such a permission group would allow users in the cloud to, for example, communicate online with other users from the cloud even after the cloud was terminated, either through a proxy (e.g., a website that does not reveal users' email addresses, a central server, etc.), directly by email, or via some other means. In such embodiments, users may be empowered to opt out of the residual permission group, in which case they may be unable to interact with others in the permission group.

In various embodiments, search functionality is provided to users via their networked devices, such as to discover existing clouds (e.g., to help a user determine whether there are any clouds he would be interested in joining) and/or to identify other information of interest. Such search functionality could filter the results based on those clouds the searching user could potentially participate in. As examples, "show only those clouds that are nearby and configured as visible (by the cloud administrator or another method of cloud configuration)" or "show only those clouds that are 'open' to arbitrary users or that have entrance admission criteria that the searching user matches." In some cases, a searching user may be allowed to see activity in a cloud before joining and even interact with participants (e.g., in a more limited fashion than if the searching user became a cloud participant), depending on the cloud configuration. In various embodiments, the user will receive a proactive notification on his mobile device when he is in the proximity of clouds that he is able to join. Such notification could be accompanied with information about the cloud, its participants, previous activity, and so on, and direct him to the nearest physical location in which he would be within the boundary of the cloud (and could therefore join).

With regard to implementation, the general case consists of at least three components: a server component, a client component, a networked device, e.g., a PC (but which could be one and the same with the client component) and a database component. The client is generally a mobile device that communicates via wireless signals over a wireless network with the server. The server (which, for scaling purposes, can be implemented as many physical servers) also sends information to the client, e.g., when the client is admitted to or exits a cloud, the server notifies the client as such and the client takes appropriate actions. The networked device, which might be the client, but which might be a separate device and is not necessarily mobile, is used to define and configure the cloud on the server. The database component is used by the server to store all cloud definition and configuration data, cloud activity and participation data and all other information associated with clouds.

A client device is in at least some embodiments capable of determining its location via global positioning system (GPS) signals or other location technologies, and if so the location information may be transmitted frequently to the server. Some or all information entered by the user into the client device, e.g., pass codes, messages to other users in a cloud, user profile updates, etc., is also transmitted to the server.

The networked device is used to define and configure a cloud. It can also be a client, but is often separate, e.g., the client might be a cellular phone while the networked device is a home PC. The networked device communicates via network signals (either wireless or wired) with the server and the user interface presented to the user is guided in large part by the instructions received from the server. Information entered by the user (e.g., the definition of a cloud) is transmitted to the server and responses (e.g., status of a cloud) are sent from the server to the networked device.

The software running on the server acts as a controller for the user interface on both the networked device and the client. Information received by the server from these two components (e.g., user-entered cloud definitions or pass codes) is stored in the database component along with information generated by the server (e.g., status changes in a cloud when access to join a cloud is granted by the server to a user). Because the server receives information from all users, it maintains a central model (which is backstored in the database component) of the state of all clouds and enforces all rules associated with a cloud.

The database component is used as an information store for the server. Cloud definitions (physical geometry and location information defining a cloud), rules associated with a cloud (e.g., whether a pass code is required for access, whether the cloud has an administrator or not, the attributes of or other admission criteria for users allowed to join a cloud, maximum users allowed in a cloud, etc.) user activity (e.g., messages sent between users within a cloud, enter/exit events, etc.) permissions, access decisions, user location information over time and so on which either flow to the server from the client and/or networked device or which are generated by software running on the server can be stored for later retrieval in the database component. The database component, like the server component, might be implemented as multiple physical database instances for scaling reasons.

Figure 2A:
FIGS. 2A-2C illustrate examples of providing location-based information and functionality to various geographical locations indicated on maps.
Figure 2B:
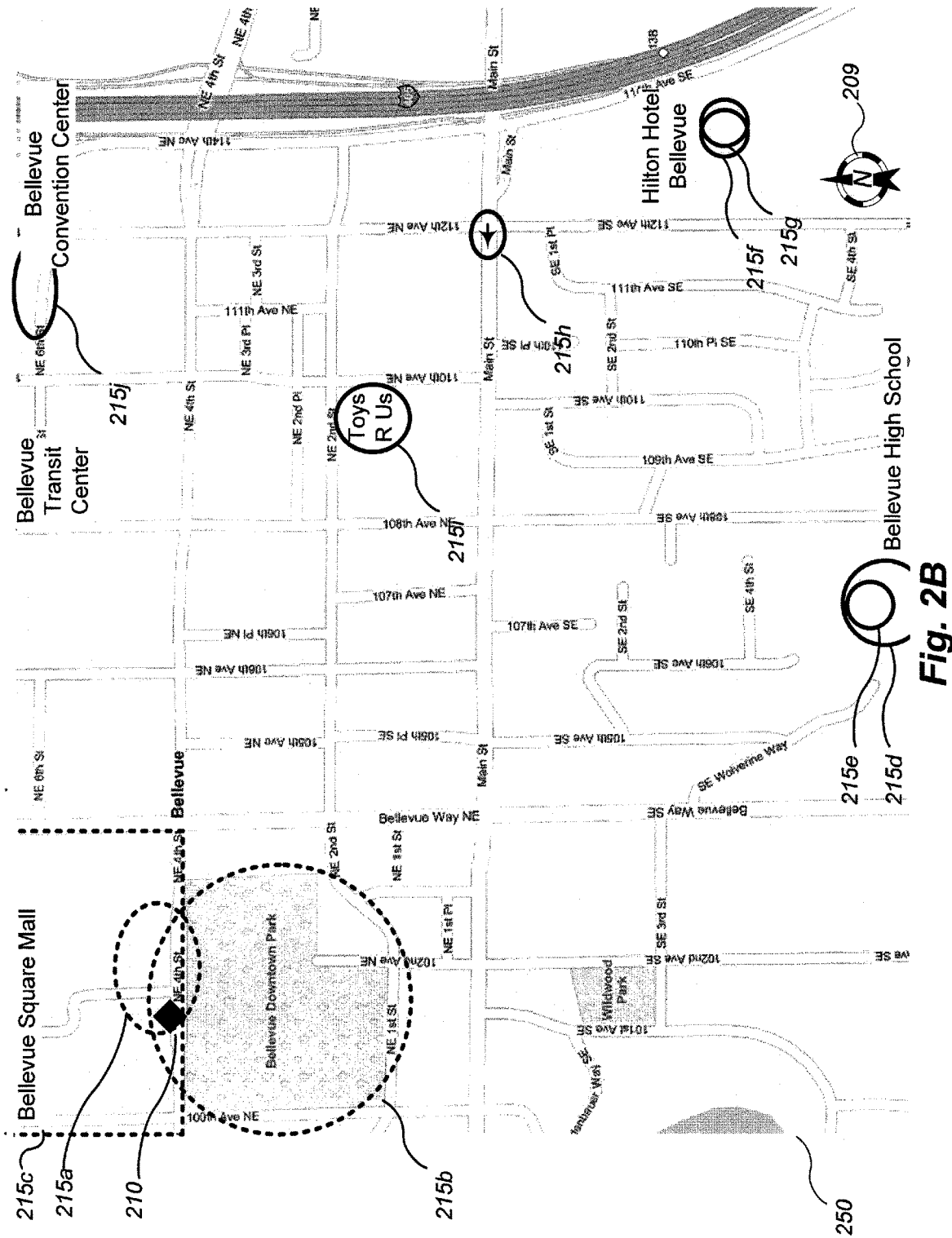
Figure 2C:
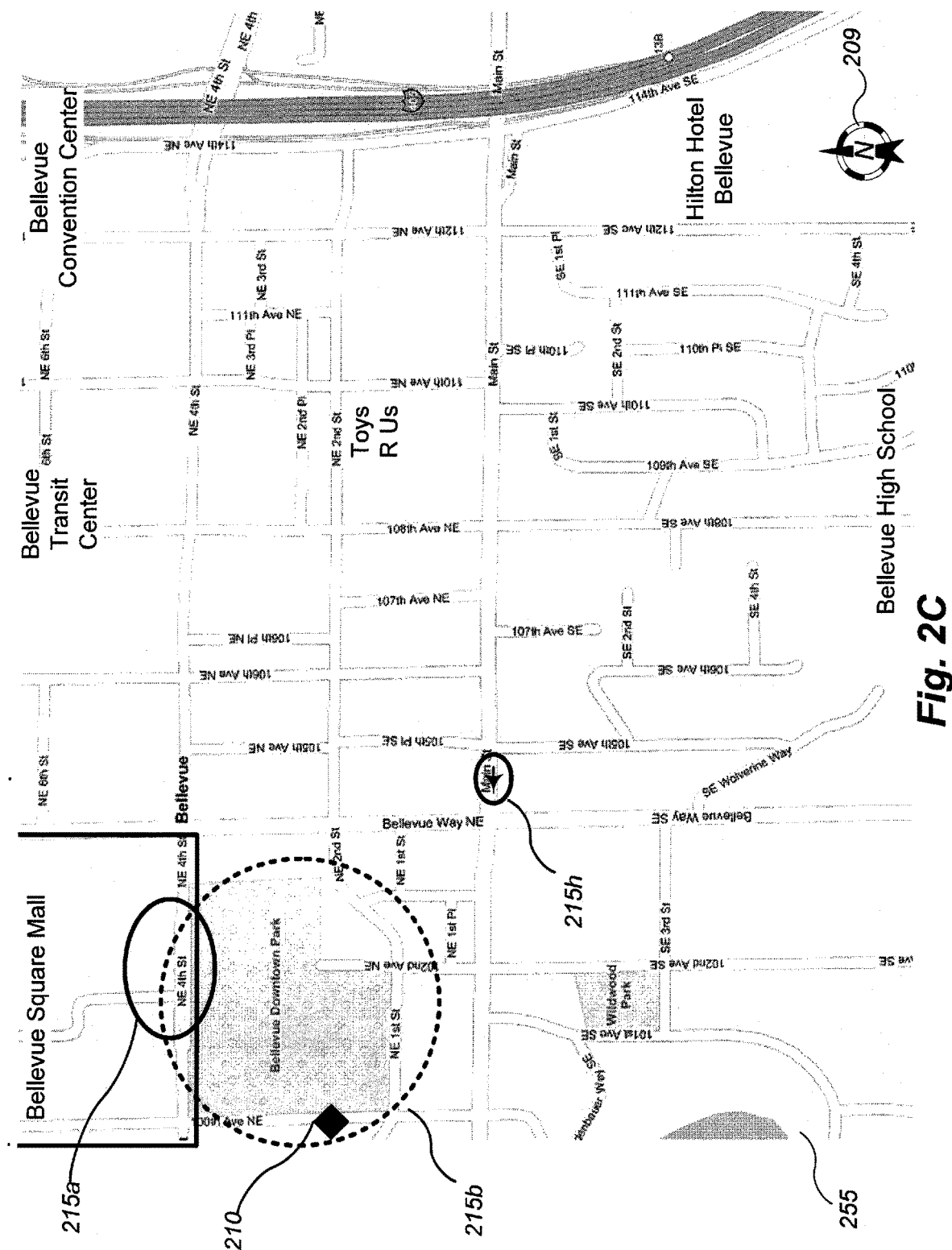

FIGS. 2A-2C illustrate examples of providing location-based information and functionality to various geographical locations indicated on maps. In particular, FIG. 2A illustrates a map 205 that shows image data (e.g., a satellite image or other photo) with road annotations for a geographical area corresponding to a section of the city of Bellevue, Wash. A particular user has a current geographic location 210 that is shown on the map with a black triangle. The illustrated map may be provided to, for example, the user for display, such as by a central server as part of a graphical user interface to provide access to cloud-related functionality. In this example, information about existing clouds in the geographical area of the map is not displayed to the user, but in other embodiments such information may be displayed.

For example, FIG. 2B illustrates an alternative map 250 for the same geographical area, but with information about various existing clouds 215 being displayed on the map. This map 250 may be provided to and/or displayed to the user in response to, for example, a request from the user for information about some or all clouds in the geographical area. In this example, the map 250 includes road information but not image data, although in other embodiments the information about the clouds 215 may instead be displayed in other manners (e.g., as part of an image data map such as that displayed in FIG. 2A). In this example, the displayed clouds have a variety of types, and in other embodiments a variety of other types of clouds may be displayed. For example, clouds 215d and 215e correspond to parts of Bellevue High School, such as the smaller cloud 215e corresponding to a particular location within the school grounds (e.g., a particular classroom, student or staff gathering area, etc.), and the larger cloud 215d corresponding to the entire school. Clouds 215f and 215g are overlapping clouds corresponding to portions of a hotel, such as to correspond to one or more of the hotel lobby, pool area, a particular floor (e.g., based on a group staying together on the floor), restaurant, etc. A cloud 215i in this example corresponds to a retail store, in this case a Toys 'R' Us store. A cloud 215j corresponds to the Bellevue Convention Center, such as a temporary cloud that corresponds to a particular current convention in progress. In addition, a cloud 215h has been established to correspond to a moving vehicle, such as a bus. In this example, a direction legend 209 is also illustrated.

In this example, the user in the location 210 is eligible to participate in 3 clouds that encompass that location. In this example, a cloud 215b is centered around a park, such as to correspond to a temporary festival or other event occurring in the park. In addition, a nearby mall has multiple clouds that encompass the location 210, including a cloud 215c corresponding to the entire mall, and a cloud 215a corresponding to a particular store in the mall. In this example, the available clouds are illustrated using dashed lines, such as to provide information to the user regarding clouds that the user may join (e.g., by selecting the displayed representation of the cloud on the map), although in other embodiments some or all of the clouds may be displayed in other manners.

FIG. 2C illustrates a map 255 similar to the map 250 of FIG. 2B, but it corresponds to a time shortly after the time represented in FIG. 2B. In particular, the user has moved to a new location 210 in which cloud 215b continues to be available to the user, but in which clouds 215a and 215c are no longer available. Similarly, the moving vehicle has traveled during the time interval, as has its corresponding cloud 215h. Other previously displayed clouds are not displayed here, such as based on user-specified modifications to the display (e.g., to show only clouds that exist within a specified distance from the user's location, such as a distance corresponding to approximately 6 blocks).

It will be appreciated that the details of FIGS. 2A-2C are provided for illustrative purposes, and are not intended to limit the scope of the invention.

Figure 1C:
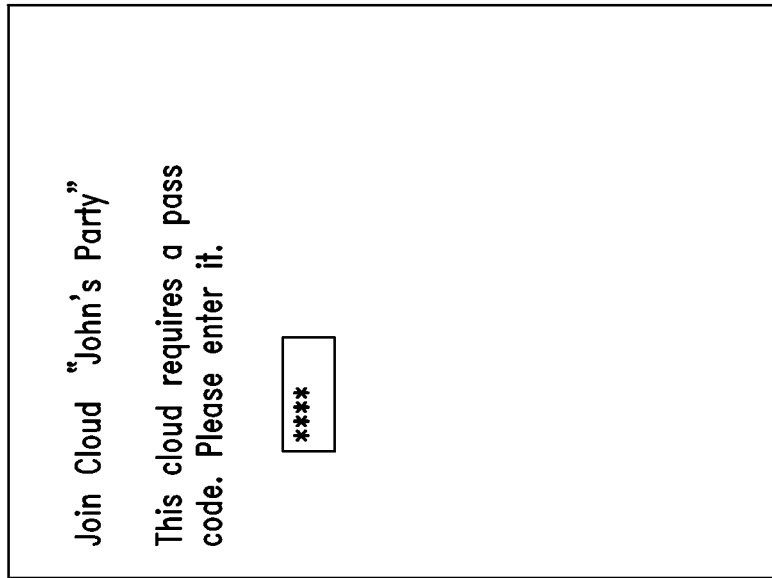
Figure 1B:
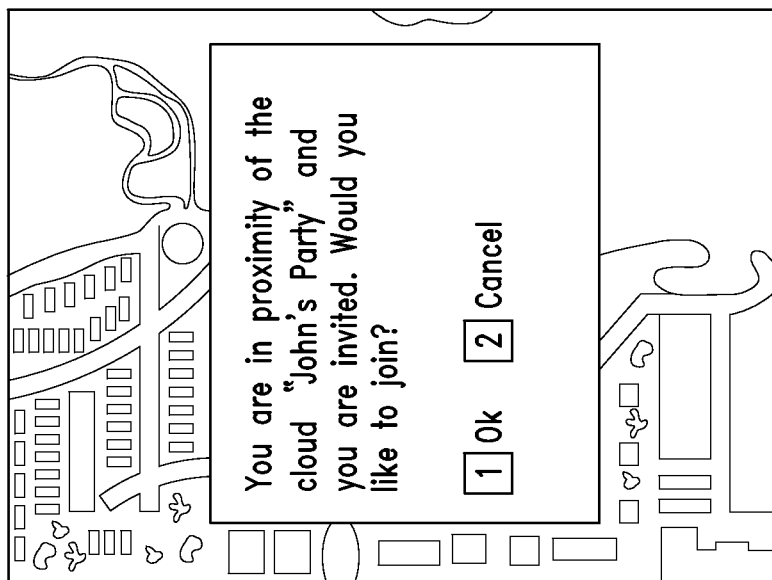

FIGS. 1B-1F depict the screen of a mobile device showing an example cloud user interface that demonstrates user interaction in certain embodiments. In FIG. 1B, a user is notified that his physical location is within the physical boundary of the cloud entitled "John's Party," such as based on the user moving into the cloud geographical area. The mobile device previously sent the user's location to the server, and the server determined the location was within the polygon associated with the cloud "John's Party." It also determined that the user is authorized to join this cloud. In this example, the user selects the "OK" option in FIG. 1B by pressing the 1 key on his mobile device, which moves the user to FIG. 1C.

FIG. 1C exemplifies a cloud configured to require a pass code. After the user enters the pass code, the user interface of FIG. 1D is displayed or otherwise presented to the user. In this example, the user has joined the cloud and sees via the user interface illustrated in FIG. 1D that there are 44 other people already participating in the cloud. The user is offered a few options, including viewing all the cloud participants, viewing people he has saved to his "Favorite People" list (which has zero people in it, since this user just joined the cloud) and sending a message to all cloud participants (which is a capability that may or may not be present in a cloud, depending on the cloud configuration and the current state of the cloud, as described earlier). The user chooses the option "View all participants" and moves to FIG. 1E.

In FIG. 1E, the user is presented with a list of 10 cloud participants out of 45 total (44 other users plus this user). The user can choose to see additional users by choosing a page number at the bottom of the list or may choose one of the users from the list. In this example, the user chooses "Jennifer Stevens" which takes him to FIG. 1F.

Figure 1F:
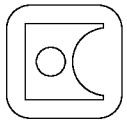

In FIG. 1F, the user is presented with information that the cloud participant Jennifer Stevens has indicated she is willing to reveal to other cloud participants. The user is presented with four options for interacting with Jennifer, including sending her a message, adding her to his Favorite People list, inviting her to be his friend (which Jennifer must accept in order for the formal relationship to be effected) or revealing his location to Jennifer. In the latter case, Jennifer would receive a message indicating that this user has revealed his location. In various embodiments, Jennifer would be able to view his location on a map so she could find him within the confines of the cloud.

Figure 3:
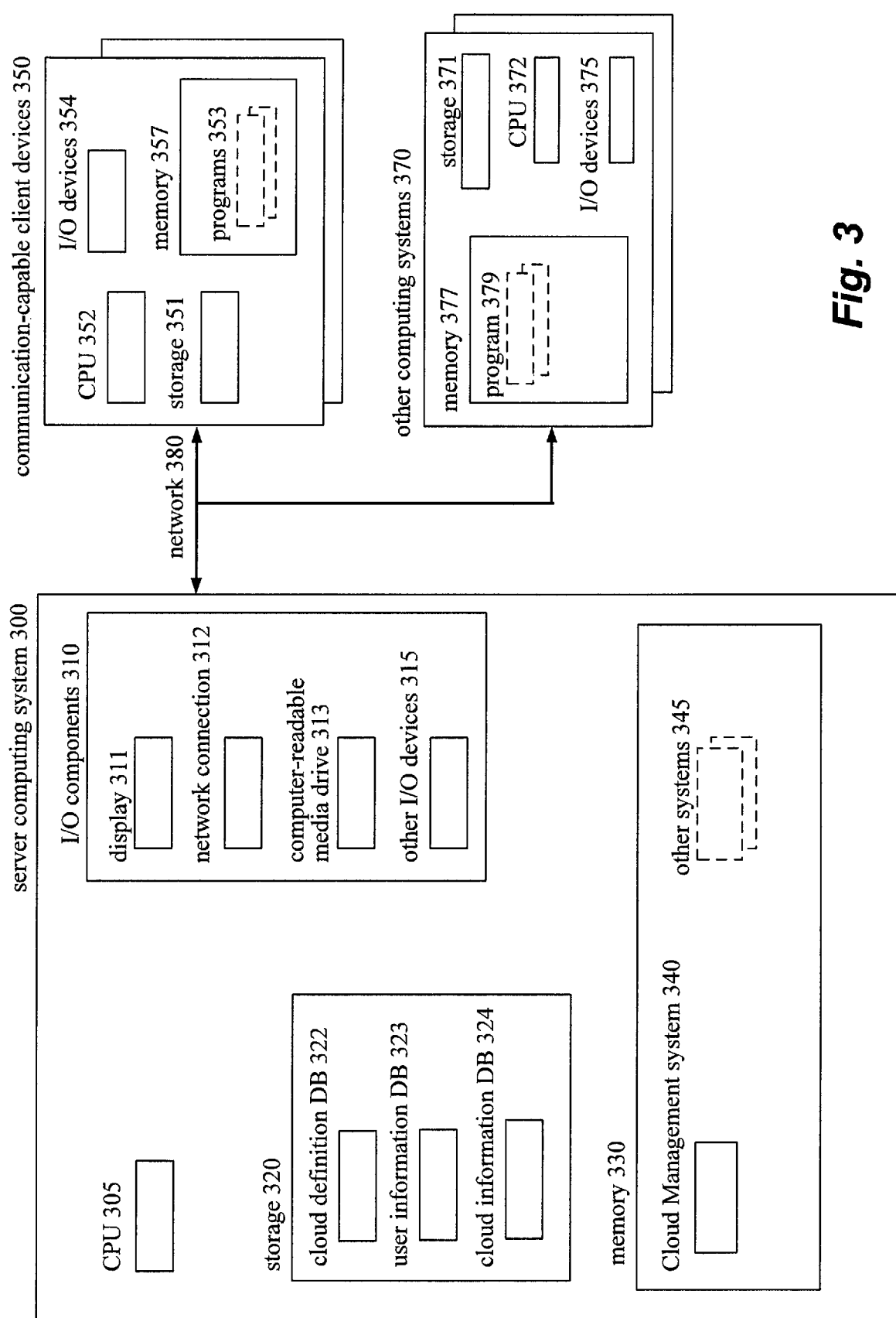
FIG. 3 is a block diagram illustrating a computing system suitable for executing an embodiment of the described Cloud Management system.

FIG. 3 is a block diagram illustrating an embodiment of a server computing system 300 that is suitable for performing at least some of the described techniques, such as by acting as a central server to manage the creation and operation of clouds. The computing system 300 includes a central processing unit ("CPU") 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, etc.).

In the illustrated embodiment, an embodiment of a Cloud Management system 350 executes in memory 330 in order to perform at least some of the described techniques, such as to provide location-based information and functionality to people and computing devices in various ways. In particular, cloud administrator users may interact with the Cloud Management system in order to define configuration information for clouds and manage the clouds, such as via communication-capable client devices 350 and/or other computing systems 370. In addition, various communication-capable client devices 350 may interact with the Cloud Management system, such as to provide location information for the devices and/or information about users of the devices, so that the Cloud Management system can determine clouds that are available to the devices and their users. In this example embodiment, cloud definition information, user information, and information about clouds (e.g., their membership, historical cloud interaction information, etc.) are stored in databases ("DBs") 322-324 respectively on store 320, although such information may be stored in other manners in other embodiments.

One or more other systems 345 may also be optionally executing in memory 330 in this example, such as payment processing system to handle fees and other payments for the Cloud Management system, a search engine to provide search capabilities to users of devices 350 other than to indicate cloud-related information, etc. The devices 350 and systems 370 may each have one or more programs 353 and 379, respectively, executing in memory 357 and 377, respectively, to provide various functionality. For example, the programs 353 may include a Web browser or other client program (e.g., a client program specific to the Cloud Management system) that a user may use to interact with the Cloud Management system, such as a program that provides a graphical user interface to users in other to provide various functionality related to participation in clouds. Similarly, the programs 379 may include a client program to allow a user to define or otherwise configure clouds, as well as to monitor and manage existing clouds. In addition, the programs 353 and/or 379 may provide a variety of other types of functionality in other embodiments, including to determine location information for the devices 350. While not illustrated here, the storage 351 and 371 on the devices 350 and systems 370, respectively, may store a variety of types of information, such as for storage 351 on a device to store information specific to a user of the device (e.g., user preference information, user attribute information relevant to determining whether the user is eligible to be admitted to clouds, etc.), to clouds and cloud-related interactions (e.g., to linked friends and bookmarked users, to communications sent to and/or received from other cloud members, etc.).

It will be appreciated that the illustrated computing systems and devices are merely illustrative and are not intended to limit the scope of the present invention. Computing system 300 and/or devices 350 may be connected to other devices that are not illustrated, including through one or more networks such as the Internet or via the Web. More generally, a "client" or "server" computing system or device may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems may in some embodiments be distributed in various components (not shown), and some functionality of the illustrated systems may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software systems and/or components may execute in memory on another device and communicate with the illustrated computing system via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
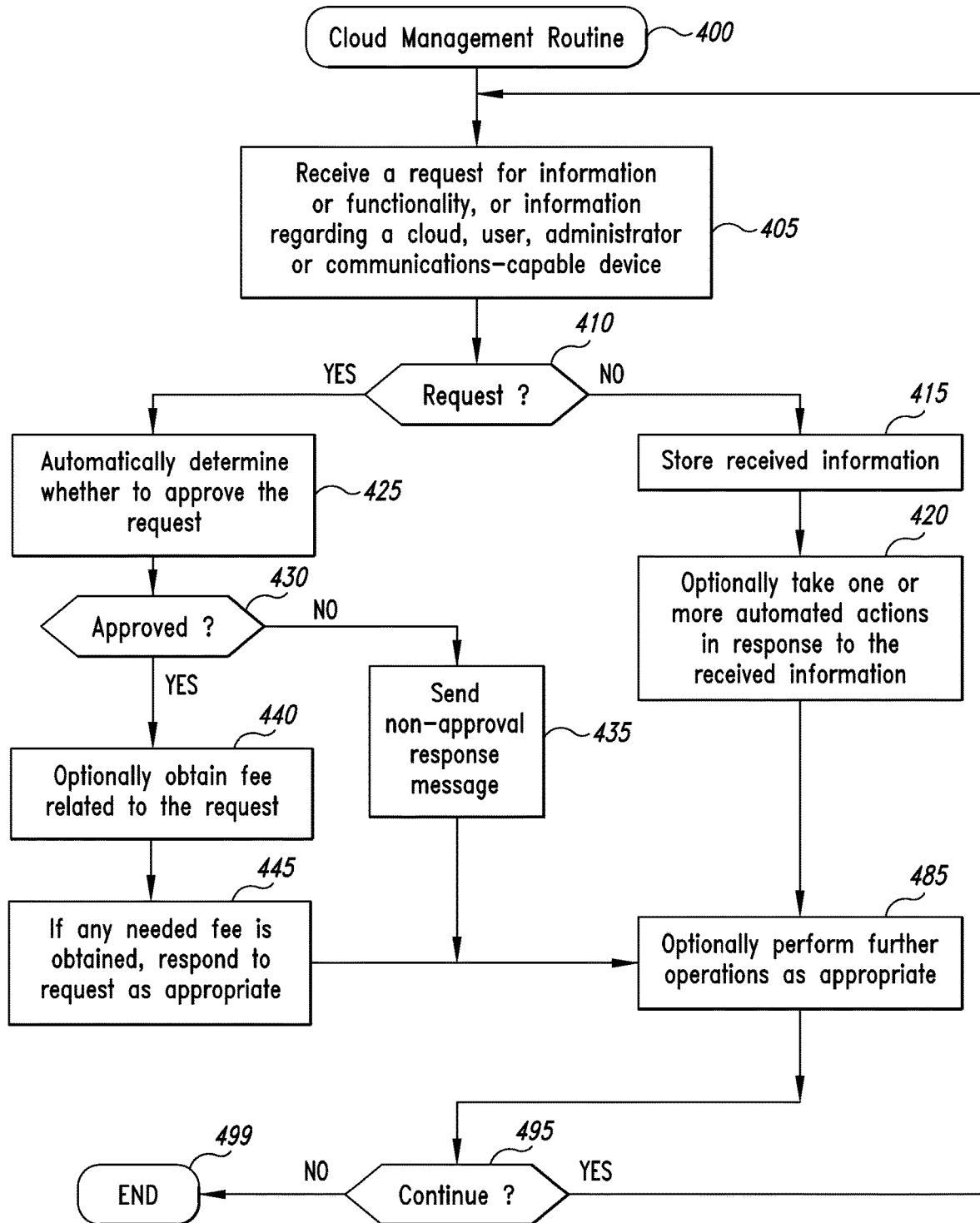
FIG. 4 is a flow diagram of an example embodiment of a Cloud Management routine.

FIG. 4 is a flow diagram of an example embodiment of a Cloud Management routine. The routine may be provided by, for example, execution of the Cloud Management system 340 of FIG. 3, such as to provide location-based information and functionality to people and computing devices in various ways.

The routine begins at step 405, where it receives a request for information or functionality related to clouds, or it receives information regarding one or more clouds, users, administrators or communication-capable devices. The routine continues to step 410 to determine whether information was received, and if so continues to step 415 to store the information. The information may include, for example, cloud configuration information from an administrator, information about a user (e.g., current user location, user preferences, etc.) from a communication-capable device, information about a communication-capable device (e.g., current device location), information about cloud management (e.g., votes from members of a cloud regarding whether to admit a new user to the cloud), etc. The routine then continues to step 420 to optionally take one or more automated actions in response to the received information (e.g., to determine whether cloud availability has changed for a user or device based on a change in location or other change in relevant attribute information, to notify a user or device of new availability to join a cloud, to determine whether to admit a new user to a cloud based on received votes from other cloud members, etc.).

If it is instead determined in step 410 that a request is received, the routine continues to step 425 to automatically determine whether to approve the request. For example, some types of requests may always be approved, such as a request from a user for information about clouds available to the user and/or about prior cloud-related interactions by the user. In addition, if the request is from a user to join a cloud, the routine may automatically determine whether to approve the request based on whether the user location and other user attributes satisfy any admission criteria for the cloud. Alternatively, if the cloud configuration indicates that a decision to allow a user to join a cloud is based on a vote by other members of the cloud, the routine may automatically determine whether to approve the request by soliciting such votes from the other cloud members and analyzing them once received. If it is determined in step 430 that the request is not approved, the routine continues to step 435 to send a non-approval or error response message to the requester. Otherwise, after step 430 the routine continues to step 440 to optionally obtain a fee related to the request, if such a fee exists. If a fee exists and is obtained, the routine continues to step 445 to respond to the request as appropriate (e.g., to add a user to a group as requested, to provide search results or query results related to clouds to a user in response to a request for the information, to add information for a user such as a bookmark to another user, to forward a communication to another group member or to perform other user interactions for users in a cloud, etc.). While not illustrated in this embodiment, if a fee exists but is not obtained, the routine may in some embodiments proceed to step 435 to send an error message, or may instead perform the request without the fee.

After steps 420, 435 and 445, the routine continues to step 485 to optionally perform other operations as appropriate, such as to perform periodic housekeeping operations. For example, matches between user locations and clouds' geographic areas may be occasionally checked, such as to identify new ad hoc or other clouds that have become available for a user, previously available clouds that are no longer available, etc. After step 435, the routine continues to step 495 to determine whether to continue. If so, the routine returns to step 405, and if not continues to step 499 and ends.

Figure 5:
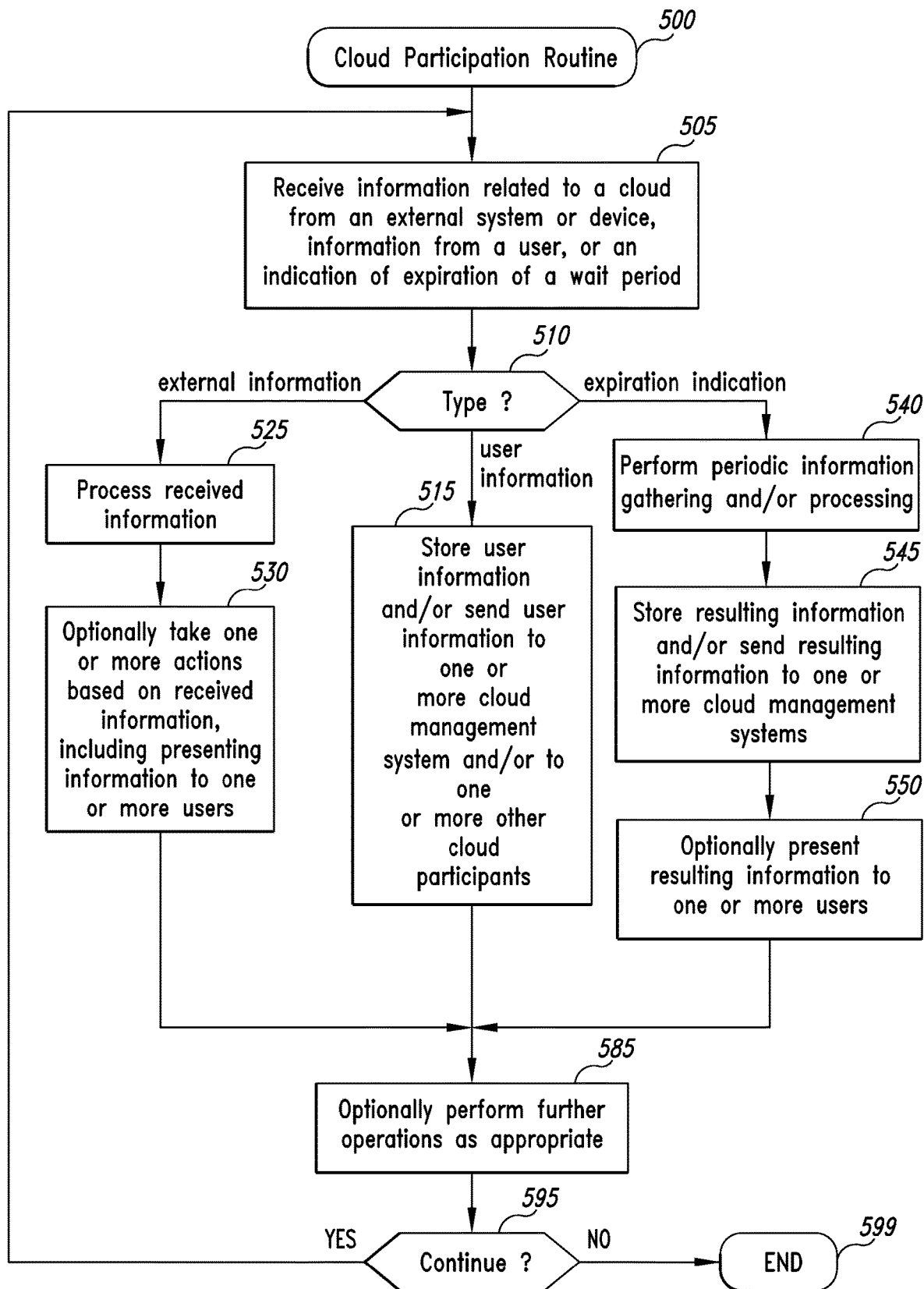
FIG. 5 is a flow diagram of an example embodiment of a Cloud Participation routine.

FIG. 5 is a flow diagram of an example embodiment of a Cloud Participation routine. The routine may be provided by, for example, execution of a program on a client device to enable participation by a user of the device in various cloud-related functionality, such as a program 353 of FIG. 3.

The routine begins in step 505, where it receives information from an external system or device (e.g., a cloud management system on a central server, a communication-capable device of another user in a cloud, etc.), information from a user, or an indication to perform periodic processing (e.g., based on expiration of a timer). If it is determined in step 510 that information from a user was received in step 505 (e.g., a request from the user for cloud-related search information or other cloud information, a request to join a cloud, a request to perform an indicated interaction with one or more other users who are cloud participants, a request to provide a vote response to the cloud management system, etc.), the routine continues to step 515 to store the received information and/or to send the received information to a cloud management system and/or device of another cloud participant if it is instead determined in step 510 that external information was received in step 505 (e.g., previously requested information received from a cloud management system, a notification of availability to join an ad hoc or other cloud, a communication or other interaction request from another cloud participant, etc.), the routine continues to step 525 to process the received information, and in step 530 to optionally take one or more actions based on the received information (e.g., to display some or all of the received information to the user, such as if previously requested information is received).

If it is instead determined in step 510 to perform periodic processing, the routine continues to step 540 to gather and/or process information (e.g., current location information for a user or device, to determine whether any ad hoc clouds are available with other devices and users, etc.). The routine then continues to step 545 to store the resulting information and/or to send the resulting information to a cloud management system, such as to send information regarding a determined current location to the cloud management system. After step 545, the routine continues to step 550 to optionally present the resulting information to one or more users, such as to present information about an available determined ad hoc cloud. After steps 515, 530, or 550, the routine continues to step 585 to optionally perform other operations as appropriate, such as to perform housekeeping operations. After step 585, the routine continues to step 595 to determine whether to continue. If so, the routine returns to step 505, and if not continues to step 599 and ends.

While not illustrated here, a program on a device used by a cloud administrator may similarly perform a routine to provide various functionality to the cloud administrator, including to obtain information about new or modified cloud definitions from the administrator and to interact with a cloud management system to apply the cloud definitions.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are discussed in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for providing functionality to location-based virtual groups of mobile devices, the computer-implemented method comprising:
   creating, by one or more programmed computing systems, a virtual group of mobile devices by:
      receiving information, input from a mobile device, defining the virtual group, the received information including (i) an indication of a first mobile device, (ii) a geographic location of the first mobile device, around which a geographic area of the virtual group is centered, and (ii) interaction rules configured to specify types of actions enabled by creation of the virtual group;
      automatically providing, by one of the one or more programmed computing systems, functionality in accordance with the user interaction rules of the virtual group; and
   periodically receiving, from each of one or more member mobile devices of the virtual group, updated location information; and
   providing an alert to the first mobile device upon a determination that a current geographic location of at least one of the one or more member mobile devices fails to meet geographic requirements of the geographic area of the virtual group.

2. The computer-implemented method of claim 1,
   wherein the received information further comprises termination criteria, that when satisfied, terminates the virtual group, and
   wherein the computer-implemented method further comprises:
   automatically determining that the termination criteria is satisfied; and
   in response to determining that the termination criteria is satisfied, terminating the virtual group.

3. The computer-implemented method of claim 1, further comprising:
   receiving a request, from a non-member mobile device, to join the virtual group, the request comprising at least the current geographic location of the non-member mobile device; and
   determining whether to admit the non-member mobile device to the virtual group based at least in part on the current geographic location of the non-member mobile device being within the geographic area of the virtual group.

4. The computer-implemented method of claim 1, further comprising:
   broadcasting content, including one or more of text data, image data, or video data, to each of the one or more member mobile devices of the virtual group.

5. The computer-implemented method of claim 1, further comprising:
   enabling access to the current geographic location of each of the one or more member mobile devices of the virtual group.

6. The computer-implemented method of claim 1, further comprising:
   applying at least of spatial hysteresis or temporal hysteresis to the current location of each of in an instance in which spatial hysteresis is applied, such that in an instance in which spatial hysteresis is applied, the providing of the alert requires a distance by which the current geographical location of the at least one of the one or more member mobile device failing to meet geographic requirements of the geographic area of the virtual group satisfies a minimum distance, and
   in an instance in which temporal hysteresis is applied, the providing of the alert requires a time for which the current geographical location of the at least one of the one or more member mobile device failing to meet geographic requirements of the geographic area of the virtual group satisfies a minimum amount of time.

7. The computer-implemented method of claim 1, further comprising:
   wherein the virtual group is a mobile cloud such that as the geographic location of the first mobile device, around which the geographic area of the virtual group is centered, changes location, the geographic area of the mobile cloud changes in response to the changes in the geographic location of the first mobile device.

8. An apparatus for providing functionality to location-based virtual groups of mobile devices, the apparatus comprising at least one processor and at least one memory including computer program code, the at least one memory and the computer program code configured to, with the processor, cause the apparatus to at least:
   create, by one or more programmed computing systems, a virtual group of mobile devices by:

receiving information, input from a mobile device, defining the virtual group, the received information including (i) an indication of a first mobile device, (ii) a geographic location of the first mobile device, around which a geographic area of the virtual group is centered, and (ii) interaction rules configured to specify types of actions enabled by creation of the virtual group;

automatically providing, by one of the one or more programmed computing systems, functionality in accordance with the user interaction rules of the virtual group; and periodically receive, from each of one or more member mobile devices of the virtual group, updated location information; and provide an alert to the first mobile device upon a determination that a current geographic location of at least one of the one or more member mobile devices fails to meet geographic requirements of the geographic area of the virtual group.

9. The apparatus of claim 8,
wherein the received information further comprises termination criteria, that when satisfied, terminates the virtual group, and wherein the at least one memory and the computer program code are further configured to, with the processor, cause the apparatus to:

automatically determine that the termination criteria is satisfied; and in response to determining that the termination criteria is satisfied, terminate the virtual group.

10. The apparatus of claim 8, wherein the at least one memory and the computer program code are further configured to, with the processor, cause the apparatus to:

receive a request, from a non-member mobile device, to join the virtual group, the request comprising at least the current geographic location of the non-member mobile device; and determine whether to admit the non-member mobile device to the virtual group based at least in part on the current geographic location of the non-member mobile device being within the geographic area of the virtual group.

11. The apparatus of claim 8, wherein the at least one memory and the computer program code are further configured to, with the processor, cause the apparatus to:

broadcast content, including one or more of text data, image data, or video data, to each of the one or more member mobile devices of the virtual group.

12. The apparatus of claim 8, wherein the at least one memory and the computer program code are further configured to, with the processor, cause the apparatus to:

enable access to the current geographic location of each of the one or more member mobile devices of the virtual group.

13. The apparatus of claim 8, wherein the at least one memory and the computer program code are further configured to, with the processor, cause the apparatus to:

apply at least of spatial hysteresis or temporal hysteresis to the current location of each of in an instance in which spatial hysteresis is applied, such that in an instance in which spatial hysteresis is applied, the providing of the alert requires a distance by which the current geographical location of the at least one of the one or more member mobile device failing to meet geographic requirements of the geographic area of the virtual group satisfies a minimum distance, and in an instance in which temporal hysteresis is applied, the providing of the alert requires a time for which the current geographical location of the at least one of the one or more member mobile device failing to meet geographic requirements of the geographic area of the virtual group satisfies a minimum amount of time.

14. The apparatus of claim 8,
wherein the virtual group is a mobile cloud such that as the geographic location of the first mobile device, around which the geographic area of the virtual group is centered, changes location, the geographic area of the mobile cloud changes in response to the changes in the geographic location of the first mobile device.

15. A computer program product for providing functionality to location-based virtual groups of mobile devices, the computer program product comprising at least one non-transitory computer-readable storage medium having computer-executable program code instructions stored therein, the computer-executable program code instructions comprising program code instructions for:

creating, by one or more programmed computing systems, a virtual group of mobile devices by:

receiving information, input from a mobile device, defining the virtual group, the received information including (i) an indication of a first mobile device, (ii) a geographic location of the first mobile device, around which a geographic area of the virtual group is centered, and (ii) interaction rules configured to specify types of actions enabled by creation of the virtual group;

automatically providing, by one of the one or more programmed computing systems, functionality in accordance with the user interaction rules of the virtual group; and periodically receiving, from each of one or more member mobile devices of the virtual group, updated location information; and providing an alert to the first mobile device upon a determination that a current geographic location of at least one of the one or more member mobile devices fails to meet geographic requirements of the geographic area of the virtual group.

16. The computer program product according to claim 15,
wherein the received information further comprises termination criteria, that when satisfied, terminates the virtual group, and wherein the computer-executable program code instructions further comprise program code instructions for:

automatically determining that the termination criteria is satisfied; and in response to determining that the termination criteria is satisfied, terminating the virtual group.

17. The computer program product according to claim 15, wherein the computer-executable program code instructions further comprise program code instructions for:

receiving a request, from a non-member mobile device, to join the virtual group, the request comprising at least the current geographic location of the non-member mobile device; and determining whether to admit the non-member mobile device to the virtual group based at least in part on the current geographic location of the non-member mobile device being within the geographic area of the virtual group.

18. The computer program product according to claim 15, wherein the computer-executable program code instructions further comprise program code instructions for:

broadcasting content, including one or more of text data, image data, or video data, to each of the one or more member mobile devices of the virtual group.

19. The computer program product according to claim 15, wherein the computer-executable program code instructions further comprise program code instructions for:
enabling access to the current geographic location of each of the one or more member mobile devices of the virtual group.

20. The computer program product according to claim 15, wherein the computer-executable program code instructions further comprise program code instructions for:
applying at least of spatial hysteresis or temporal hysteresis to the current location of each of in an instance in which spatial hysteresis is applied, such that in an instance in which spatial hysteresis is applied, the providing of the alert requires a distance by which the current geographical location of the at least one of the one or more member mobile device failing to meet geographic requirements of the geographic area of the virtual group satisfies a minimum distance, and
in an instance in which temporal hysteresis is applied, the providing of the alert requires a time for which the current geographical location of the at least one of the one or more member mobile device failing to meet geographic requirements of the geographic area of the virtual group satisfies a minimum amount of time.

21. The computer program product according to claim 15, wherein the computer-executable program code instructions further comprise program code instructions for:
wherein the virtual group is a mobile cloud such that as the geographic location of the first mobile device, around which the geographic area of the virtual group is centered, changes location, the geographic area of the mobile cloud changes in response to the changes in the geographic location of the first mobile device.

* * * * *